United States Patent
Nagai et al.

(10) Patent No.: US 9,092,288 B2
(45) Date of Patent: Jul. 28, 2015

(54) ONLINE UPDATE METHOD FOR VEHICLE-MOUNTED DEVICE

(75) Inventors: Yasushi Nagai, Yokohama (JP); Atsushi Shimizu, Yokohama (JP); Hiroyuki Kasuya, Hitachinaka (JP); Shoichi Akutsu, Saitama (JP); Shinji Kawamura, Saitama (JP); Yoshitaka Sumitomo, Saitama (JP)

(73) Assignee: CLARION CO., LTD., Tokyo (JP)

( * ) Notice: Subject to any disclaimer, the term of this patent is extended or adjusted under 35 U.S.C. 154(b) by 663 days.

(21) Appl. No.: 13/290,380

(22) Filed: Nov. 7, 2011

(65) Prior Publication Data

US 2012/0124571 A1 May 17, 2012

(30) Foreign Application Priority Data

Nov. 12, 2010 (JP) ................................. 2010-253389

(51) Int. Cl.

| G06F 9/44 | (2006.01) |
|---|---|
| G06F 7/00 | (2006.01) |
| G06F 11/30 | (2006.01) |
| G07C 5/00 | (2006.01) |
| G06F 9/445 | (2006.01) |
| G06F 11/14 | (2006.01) |
| G06F 1/30 | (2006.01) |

(52) U.S. Cl.
CPC .............. *G06F 8/61* (2013.01); *G06F 11/1433* (2013.01); *G06F 1/30* (2013.01); *G07C 5/00* (2013.01)

(58) Field of Classification Search
None
See application file for complete search history.

(56) References Cited

U.S. PATENT DOCUMENTS

| 6,122,682 | A * | 9/2000 | Andrews .......................... 710/65 |
|---|---|---|---|
| 6,647,322 | B1 * | 11/2003 | Hayashi et al. ............... 709/217 |
| 6,760,650 | B2 * | 7/2004 | Shinichi et al. ............... 717/173 |
| 7,286,908 | B2 * | 10/2007 | Hayashi et al. ............... 717/173 |
| 7,707,573 | B1 * | 4/2010 | Marmaros et al. ............ 717/171 |
| 8,099,482 | B2 * | 1/2012 | Clark et al. .................... 717/178 |
| 8,397,228 | B2 * | 3/2013 | Matlin et al. .................. 717/168 |
| 8,655,541 | B2 * | 2/2014 | You ................................ 717/173 |
| 2002/0103578 | A1 | 8/2002 | Hayashi et al. |
| 2003/0139857 | A1 * | 7/2003 | Hayashi et al. .................... 701/1 |
| 2006/0074750 | A1 * | 4/2006 | Clark et al. ..................... 705/14 |
| 2006/0161314 | A1 * | 7/2006 | Honmura ...................... 717/168 |

(Continued)

FOREIGN PATENT DOCUMENTS

| EP | 1 022 656 A2 | 7/2000 |
|---|---|---|
| EP | 2 416 243 A1 | 2/2012 |

(Continued)

*Primary Examiner* — Don Wong
*Assistant Examiner* — Erika Kretzmer
(74) *Attorney, Agent, or Firm* — Volpe and Koenig, P.C.

(57) ABSTRACT

When a power supply is cut off on updating programs, improper data remains since the power source to be supplied to the vehicle-mounted device is unstable. The check for the improper data and restoration processing are required for a reactivation processing implemented by an update processing unit so that the update is completed correctly, therefore, the user is waited. In contrast, the update processing also implemented by the update processing unit for a time period during which the power source becomes unstable is interrupted, and implemented for the time period during which the power source voltage is stable. The power source voltage is considered to be unstable based on a function of the vehicle speed, brake pedal actuation, parking brake actuation, and/or power source activation. In consequence, the update processing is carried on steadily without making the user wait.

9 Claims, 11 Drawing Sheets

(56) References Cited

U.S. PATENT DOCUMENTS

| | | | |
|---|---|---|---|
| 2009/0125900 A1* | 5/2009 | Matlin et al. | 717/168 |
| 2010/0031248 A1* | 2/2010 | Sonkin et al. | 717/174 |
| 2011/0307882 A1* | 12/2011 | Shiba | 717/173 |
| 2013/0002415 A1* | 1/2013 | Walli et al. | 701/1 |
| 2013/0079950 A1* | 3/2013 | You | 701/1 |

FOREIGN PATENT DOCUMENTS

| | | |
|---|---|---|
| JP | 2003-122575 A | 4/2003 |
| WO | 2010 113348 A1 | 10/2010 |

* cited by examiner

FIG. 5

| LARGE ITEM | SMALL ITEM | CONTENTS |
|---|---|---|
| EXECUTION UNDERWAY UPDATE PROCESSING 117-10 | | DOWNLOAD PROCESSING or PROGRAM UPDATE PROCESSING |
| DOWNLOAD PROCESSING PROGRESS 117-20 | DOWNLOAD SERVER 117-21 | ADDRESS OF DOWNLOAD SERVER |
| | DOWNLOAD FILE 117-22 | DOWNLOAD FILE NAME |
| | DOWNLOAD-FILE WRITE COMPLETED BYTE NUMBER 117-23 | DOWNLOAD-FILE WRITE COMPLETED BYTE NUMBER |
| PROGRAM UPDATE PROCESSING PROGRESS 117-30 | PROGRAM UPDATE FILE 117-31 | UPDATE FILE NAME |
| | PROGRAM-UPDATE FILE WRITE COMPLETED BYTE NUMBER 117-32 | UPDATE-FILE WRITE COMPLETED BYTE NUMBER |

FIG. 9

| LARGE ITEM | SMALL ITEM | CONTENTS |
|---|---|---|
| EXECUTION UNDERWAY UPDATE PROCESSING 117-10 | | DOWNLOAD PROCESSING or PROGRAM UPDATE PROCESSING or REACTIVATION UPDATE PROCESSING |
| DOWNLOAD PROCESSING PROGRESS 117-20 | DOWNLOAD SERVER 117-21 | ADDRESS OF DOWNLOAD SERVER |
| | DOWNLOAD FILE 117-22 | DOWNLOAD FILE NAME |
| | DOWNLOAD-FILE WRITE COMPLETED BYTE NUMBER 117-23 | DOWNLOAD-FILE WRITE COMPLETED BYTE NUMBER |
| PROGRAM UPDATE PROCESSING PROGRESS 117-30 | PROGRAM UPDATE FILE 117-31 | UPDATE FILE NAME |
| | PROGRAM-UPDATE FILE WRITE COMPLETED BYTE NUMBER 117-32 | UPDATE-FILE WRITE COMPLETED BYTE NUMBER |
| REACTIVATION UPDATE PROCESSING PROGRESS 117-40 | REACTIVATION UPDATE FILE 117-41 | REACTIVATION UPDATE FILE NAME |
| | REACTIVATION-UPDATE FILE WRITE COMPLETED BYTE NUMBER 117-42 | REACTIVATION-UPDATE FILE WRITE COMPLETED BYTE NUMBER |

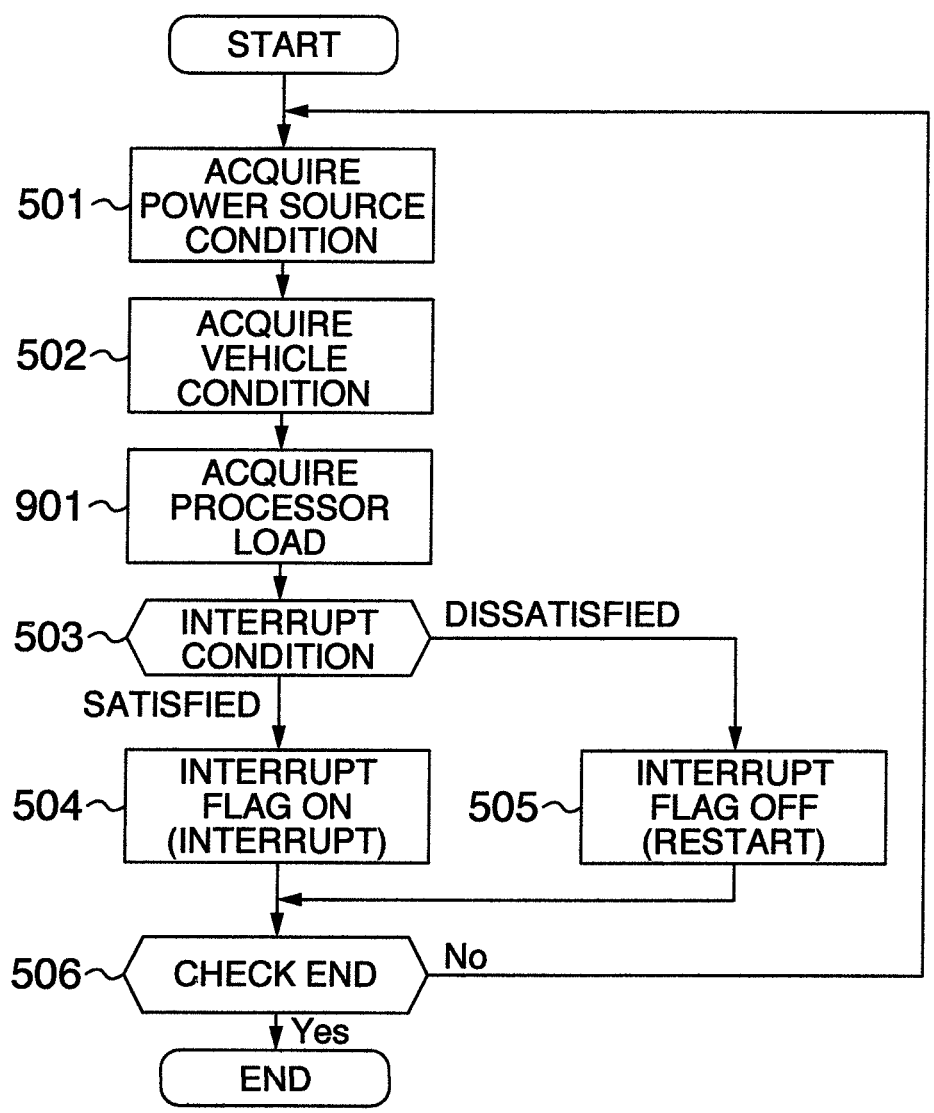

ONLINE UPDATE METHOD FOR VEHICLE-MOUNTED DEVICE

INCORPORATION BY REFERENCE

This application claims priority based on a Japanese patent application, No. 2010-253389 filed on Nov. 12, 2010, the entire contents of which are incorporated herein by reference.

BACKGROUND

The subject matter disclosed in this description relates to an online update method for vehicle-mounted device.

In the past, it has been difficult to update a function of software and correct its trouble for a vehicle-mounted device which once came onto the market, in the case that the device has no online update function in the software. Specifically, the update of function has been implemented by using update CDs and SD memories selling or distributing in the market in the past, therefore, there is a problem that such media is not circulated around users who are not registered as a user registration or people using a used car. Further, it has taken a lot of time to deliver an update notification by mail, or CD and SD memory by other delivery companies.

In a method of solving the above-mentioned problem, there exists a method referred to as an online update in which a program is downloaded via a network to update the program. For example, the update for the vehicle-mounted device providing an online update function can be notified to all of the vehicle-mounted devices coupled with a network via another network by using the configuration of online update as disclosed in JP-A-2003-122575 ([0002]-[0011]). Further, the update can be started immediately by requesting the update and receiving the notification from the user of vehicle-mounted device, therefore, it does not take a time for the start and delivery. As mentioned above, it is not required to select a time and location, for updating the program and data in the vehicle-mounted device providing the online update function in which the program and data are downloaded to implement the update, therefore, the update becomes easily.

SUMMARY

JP-A-2003-122575 discloses a configuration in which a firmware application is downloaded to implement the update. The online update function is provided in the vehicle-mounted device as disclosed in JP-A-2003-122575 to become the update easily without selecting the time and location. However, a time period, during which an originally possessed function in the vehicle-mounted device such as a reactivation necessary for the update cannot be implemented, is increased. In consequence, a time during which the user is waited is increased.

For example, when a validation is implemented for such as a check sum of firmware as an activation target before activation, the program for providing a service to the user for the validation period is not activated, therefore, the user is waited. Furthermore, when the update starts after the validation, the user must wait until the update process is completed for the time period of the update.

In addition, the power to be supplied to the vehicle-mounted device is unstable. Improper data remains when the power supply is cut off on the download and update, therefore, a processing for checking and recovering the data is required in an activation processing. In consequence, the time period during which the user is waited is increased.

A high capacity storage device has a large write unit, and time loss is enormous when the write is failed. For example, a hard disk handles the unit of 512 to 4 Kbytes data. The write unit for nonvolatile memory such as a flash memory trends towards becoming large year after year. Particularly, in a flash memory such as a multiple-valued storage, the write failure in a write unit block of one address sometimes causes destroying data of the other block. For this reason, the write failure results in losing bulky data. For example, when the write for download data is failed and the data block of 128 K bytes is lost, a retransmission processing is required for at least 16 seconds in the case of 64 Kbps line.

Further, the reactivation is sometimes required for the vehicle-mounted device when the update is implemented for the data and program using in the program on execution.

This is because a mismatch occurs between the program on the execution and the program and data in an update targeted storage device, caused by the update. When the update processing required for the reactivation is implemented immediately after a preprocessing for the download and update is completed, a time period, during which a service to be provided by the vehicle-mounted device cannot be provided, occurs since the vehicle-mounted device is stopped once. There also exists a method of implementing the update processing requiring the reactivation in the activation. However, in this method, the time period becomes long until the program for providing the service of vehicle-mounted device is activated, therefore, the user is waited.

In this description, the configuration will be described such that the time period, during which the power source voltage is stable, is selected to carry on the update steadily, without making the user wait.

An example described in this description is concerned with a control of an interrupt and restart for a below-mentioned download and update processing. That is, a coming of the time period, during which the power source is unstable, is predicted to interrupt the download and update processing. The processing, which is interrupted, restarts at a timing capable of continuing the time period during which the power source is stable, and the download and update processing is implemented for the time period during which the power source is stable.

The condition of power source on a vehicle is classified as: a state ACC_OFF where an engine stops and the power is only supplied to a security device operated by a tiny current, the vehicle-mounted device requiring a learning and ECU (Electronic Control Unit); a state ACC_ON where the power is supplied to an accessory instrument such as an audio instrument unnecessary directly for a vehicle travel; a state START where the power is supplied to an auxiliary motor for starting the engine; and a state ON where the engine runs to supply electricity from a dynamo and charge a battery.

In addition, ACC means the power source, ON/OFF of which is controlled by an engine key or an engine start button. In addition, there exists a power source referred to as +B which supplies the power, regardless of the condition in the engine key or engine start button.

Of the four conditions, the time period during which the power source in the vehicle-mounted device becomes unstable, is the state START during which a power source voltage for rotating the auxiliary motor to start the engine is reduced. This time period is predicted by a voltage reduction predicting means to determine timing for the interrupt and restart. Specifically, it is determined that the power source is stable for the time period of ACC_ON and ACC_OFF on the vehicle travel and after the vehicle stops, it is detected that a vehicle speed is zero and a brake pedal is being actuated, and it is predicted that the state is transferred to START for starting the engine.

The download is implemented for the time period of ACC_ON and ACC_OFF on the travel and after the vehicle stops, and the actuation of the brake pedal is detected in the stop to interrupt the download. The write on the processing is completed before entering the time period of START, during which the power voltage is reduced. The update processing starts after completing the download.

When the update processing requires the reactivation, the reactivation for executing the update program to write the download program and data in a nonvolatile storage device is implemented for the time period of the state ACC_OFF after the vehicle stops. The actuation of the brake pedal is detected to interrupt the update and complete the write on the processing before entering the time period of START, during which the power voltage is reduced. An ordinary program is executed for the time period of the state ON after START, and the update program is activated at the time of again entering the time period of ACC_OFF to restart the update processing.

According to the teaching herein, the time period during which the power source voltage is stable is selected to be able to provide the configuration for carrying on the update steadily.

The other objects, features and advantages will become apparent from the following description of the embodiments.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 5 is an explanatory diagram showing a structure example of an update progress data;

FIG. 9 is an explanatory diagram showing a configuration example of update progress data considered of the update processing containing the reactivation processing;

FIG. 11 is a flowchart showing an operation example of the interrupt and restart detecting unit considered of a processor load.

DETAILED DESCRIPTION OF THE EMBODIMENTS

Hereinafter, embodiments will be described with reference to the drawings.

Embodiment 1

In a first embodiment, a description will be concerned with an example of a system for implementing an online update for a vehicle-mounted device.

Figure 1:
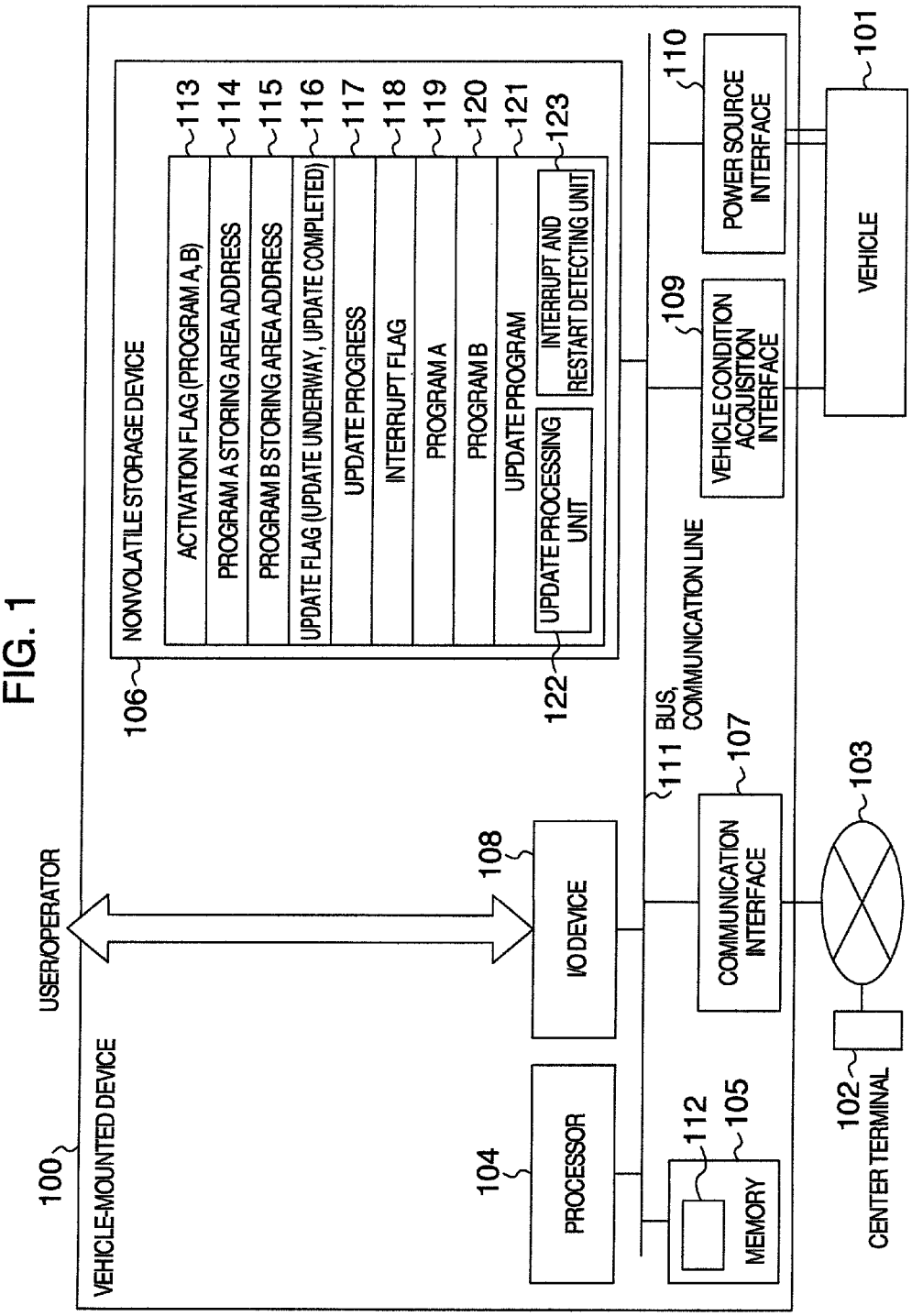
FIG. 1 is a diagram showing a configuration example of an online update system for a vehicle-mounted device.

FIG. 1 shows a configuration example of the online update system in this embodiment.

The online update system in this embodiment is configured by a vehicle-mounted device 100, a vehicle 101 mounted with the vehicle-mounted device 100, a center terminal 102 for distributing an update program of the vehicle-mounted device, and a network 103 coupled with the center terminal 102 and the vehicle-mounted device 100.

The vehicle-mounted device 100 includes a processor 104, a memory 105, a nonvolatile storage device 106, a communication interface 107 for transmitting and receiving data with other terminals by communication, an I/O device (display, speaker, touch panel, key, etc.) 108 for implementing input and output with viewers, operators, etc., a vehicle condition acquisition interface 109, and a power source interface 110. These are coupled with a communication line 111, such as a bus.

The processor 104 reads in a program 112, stored in the storage device 106, in the memory 105 to execute various processes. These program and data may be stored in the storage device 106 in advance, may be entered from a storage medium such as CD-ROM, and may be downloaded from the other devices via a network. A function realized by the program may be implemented by an exclusively used hardware.

The nonvolatile storage device 106 stores an activation flag 113, a service program A (hereinafter, referred to as program A) storing area address 114, a service program B (hereinafter, referred to as program B) storing area address 115, an update flag 116, an update progress 117, an interrupt flag 118, a program A 119, a program B 120, and an update program 121. The storage device 106 may use of not only a flash memory used fixedly for ROM or for a storage device, but also a carriageable memory (SD memory, USB memory) and HDD, CD, DVD, BD, etc., and the vehicle-mounted device 100 may select a single or plural storage areas from the above-mentioned media to be able to refer contents. That is, the storage area may be made up of plural storage devices.

The processor 104 executes the above-mentioned programs to realize a function mentioned below, however, the respective programs will be described as anchored by execution, in a matter of convenience.

The activation flag 113 indicates the program to read in by the processor 104 and the program to be an update target in the activation. Specifically, when the program is used in the activation, the processor 104 indicates whether it reads in the program A 119 or the program B 120 to execute it. The update method in this embodiment makes the area storing an unemployed program in the activation rewrite and make new area. That is, when the activation flag 113 indicates the program A 119, the area storing the program B 120 is rewritten to be updated. When it indicates the program B 120, the area storing the program A 119 is rewritten to be updated.

The program A storing area address 114 indicates an address for storing the program A 119. When the vehicle-mounted device 100 activates and the activate flag 113 indicates the program A 119, the processor 104 reads out the program A 119 from an address indicated by the program A storing area address 114 to store in the memory 105 and execute it. When the vehicle-mounted device 100 is updated and the activation flag 113 indicates the program B 120, the update program 121 executed by the processor 104 rewrites the program and data in the address indicated by the program A storing area address 114 to update them.

The program B storing area address 115 indicates an address for storing the program B 120. When the vehicle-mounted device 100 activates and the activation flag 113 indicates the program B 120, the processor 104 reads out the program B 120 from an address indicated by the program B storing area address 115 to store in the memory 105 and execute it. When the vehicle-mounted device 100 is updated and the activation flag 113 indicates the program A 119, the update program 121 executed by the processor 104 rewrites the program and data in an address indicated by the program B storing area address 115 to update them.

The update flag 116 indicates an update condition of whether the update is underway or completed. When the update flag 116 is ON, it is represented that the vehicle-mounted device 100 is updated underway, and when the flag is OFF, it is represented that the update is completed. The vehicle-mounted device 100 checks the flag in the activation. If the update flag 116 is ON, it is understandable that the update processing to be interrupted and continuously processed is remained, when the vehicle-mounted device 100 stopped previously. That is, it can be determined whether the interrupted update processing is presence or absence by checking the update flag 116.

The update progress 117 is a record of the update processing in the online update system. The update processing carries on while the update program 121 records the progress in the update progress 117. For this reason, the update processing can restart continuously by referring the update progress 117 even though the update processing is interrupted. The processing in an update processing unit 122 for executing the update program 121 in this embodiment is divided largely into two: a download processing and a program update processing. As adapted to this division, the update progress 117 records information of an execution underway update processing 117-10, a download processing progress 117-20 and a program update processing progress 117-30, as shown in FIG. 5, as an explanatory diagram, illustrating an example of update progress data structure.

The execution underway update processing 117-10 indicates whether the update processing being executed corresponds to the download processing or program update processing.

The download processing progress 117-20 includes information of a download server 117-21, a download file 117-22, and download-file write completed byte number 117-23. The download server 117-21 records an address of center terminal 102 as a server for delivering an update file. The download file 117-22 records download file information delivered by the center terminal 102 and downloaded by the vehicle-mounted device 100. The download-file write completed byte number 117-23 records the number of bytes completely written in the storage device 106 by downloading a file indicated by the download file 117-22 in the vehicle-mounted device 100.

The program update processing progress 117-30 includes a program update file 117-31 and program-update file write completed byte number 117-32. The program update file 117-31 records a processing target file, as an executable program, to be written in the storage device 106. The program-update file write completed byte number 117-32 records the number of bytes completely written in the storage device 106 by extracting update data, as the executable program, from a download file.

The interrupt flag 118 records instructions of the interrupt and restart to the update processing unit 122 from an interrupt and restart detecting unit 123 in the update program 121. It indicates that an interrupt instruction is indicated from the interrupt and restart detecting unit 123 to the update processing unit 122, when the interrupt flag 118 is ON. It also indicates that a restart instruction is indicated from the interrupt and restart detecting unit 123 to the update processing unit 122, when the interrupt flag 118 is OFF.

The program A 119 realizes a function of the vehicle-mounted device 100, such as a firmware, an OS, a driver, an application program, etc. in the vehicle-mounted device 100. When the activation flag 113 indicates the program A in the activation of vehicle-mounted device 100, the program A 119 is executed. When the activation flag 113 indicates the program B in the update of vehicle-mounted device, the update program 121 updates the program A 119.

The program B 120 realizes a function of the vehicle-mounted device 100, such as the firmware, OS, driver, application program, etc. in the vehicle-mounted device 100. When the activation flag 113 indicates the program B in the activation of vehicle-mounted device 100, the program B 120 is executed. When the activation flag 113 indicates the program A in the update of vehicle-mounted device 100, the update program 121 updates the program B 120.

The update program 121 executes the update of vehicle-mounted device 100, including the update processing unit 122 and interrupt and restart detecting unit 123.

Figure 4:
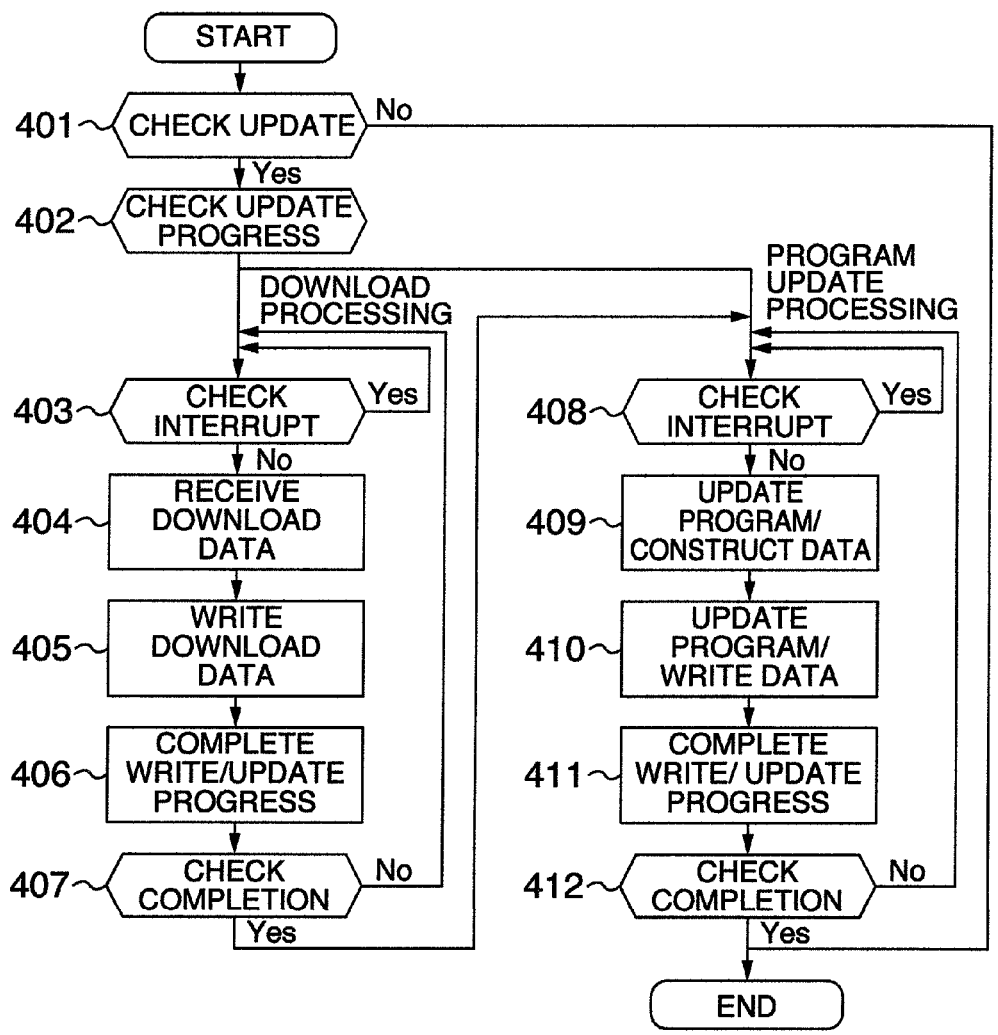
FIG. 4 is a flowchart showing an operation of an update processing unit.

An operation of the update processing unit 122 is implemented along with a flowchart shown in FIG. 4, in which the update file is downloaded from the center terminal 102 via the communication interface 107 and network 103 to write the update program in the storage device 106. The update processing unit 122 updates the program A 119 or program B 120 while referring to the information recorded in the storage device 106. The update processing unit 122 carries on with the processing while checking the interrupt flag 118 to be updated by the interrupt and restart detecting unit 123. When the interrupt flag 118 is ON, the processing is interrupted after completing the write of data on the processing and the update of update progress 117. In consequence, a control can be implemented such that the update processing is not implemented for the time period during which the power source voltage is unstable and a user is waited. Next, when the interrupt flag 118 is OFF on the operation of vehicle-mounted device 100, the subsequent processing recorded in the update progress 117 is restarted. Likewise, the interrupted subsequent processing is restarted while referring to the update progress 117, even when the vehicle-mounted device 100 is reactivated. In this way, the update processing carries on while repeating the interrupt and restarts without losing data by the interrupt on writing it, in the online update system of this embodiment.

Figure 6:
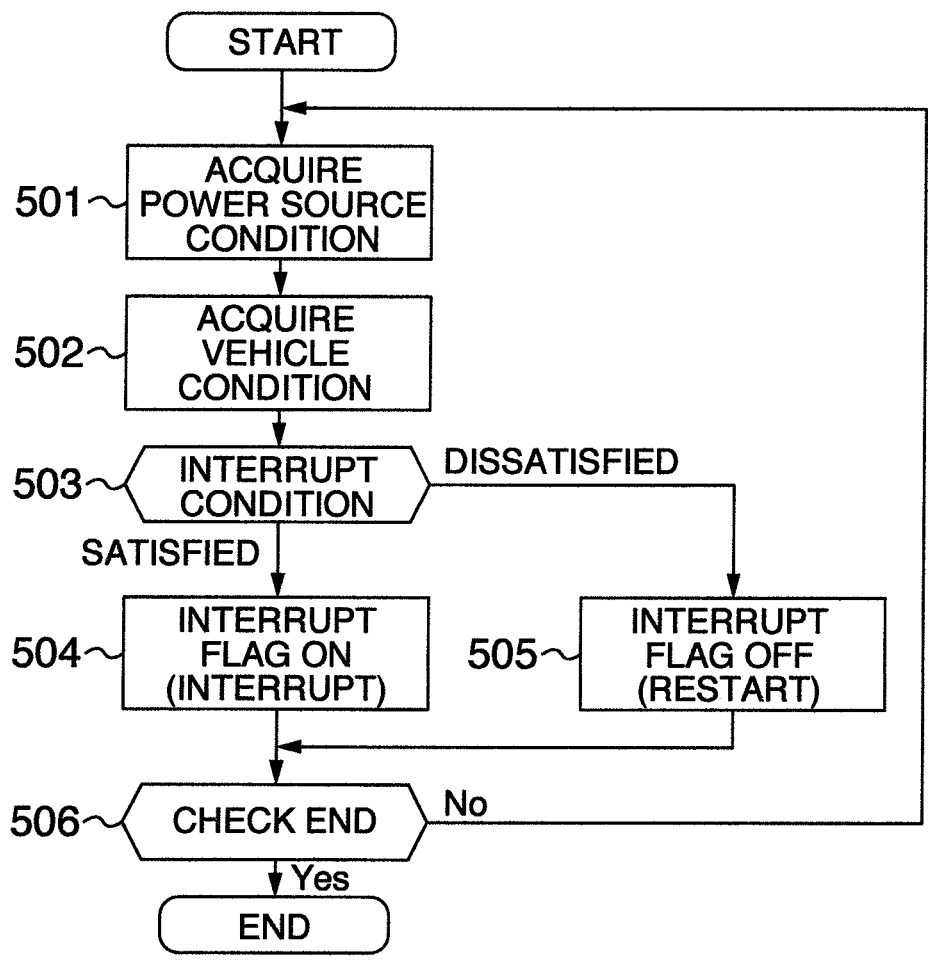
FIG. 6 is a flowchart showing an operation example of an interrupt and restart detecting unit.

The interrupt and restart detecting unit 123 acquires a brake pedal condition and a vehicle speed and/or a parking brake condition from the vehicle condition acquisition interface 109 and also acquires a power source condition from the power source interface 110, along with a flowchart in FIG. 6. From the acquired result, a condition having high probability in which the supply power becomes unstable is detected to make the interrupt flag 118 ON, and a condition having high probability in which the supply power becomes stable and a condition having low probability in which the user is waited, are detected to make the interrupt flag 118 OFF.

The communication interface 107 is used for communicating with servers and other terminals outside the vehicle-mounted device 100. The communication interface 107 may be of a wireless or wire communication interface, both of which may also be used depending on circumstances. For example, the wire communication interface is used for a condition where the vehicle stops, and the wireless communication interface is used for a condition where the vehicle travels. Generally, the wire communication interface is higher speed than the wireless communication interface. For this reason, a download time can be shortened by using the wire communication interface.

The I/O device 108 includes a pointing device, such as a key, touch panel, trackball, etc. for receiving a signal from the user of vehicle-mounted device 100, viewer and operator; a display, a speaker, a light such as LED, etc. for supplying an output to the user, viewer and operator. The user of vehicle-mounted device 100 can instruct to execute the update program 121 depending on the I/O device 108, and can check the progress of the update processing in the update program 121.

The vehicle condition acquisition interface 109 receives the brake pedal condition, vehicle speed and parking brake condition from the vehicle 101.

Figure 2:
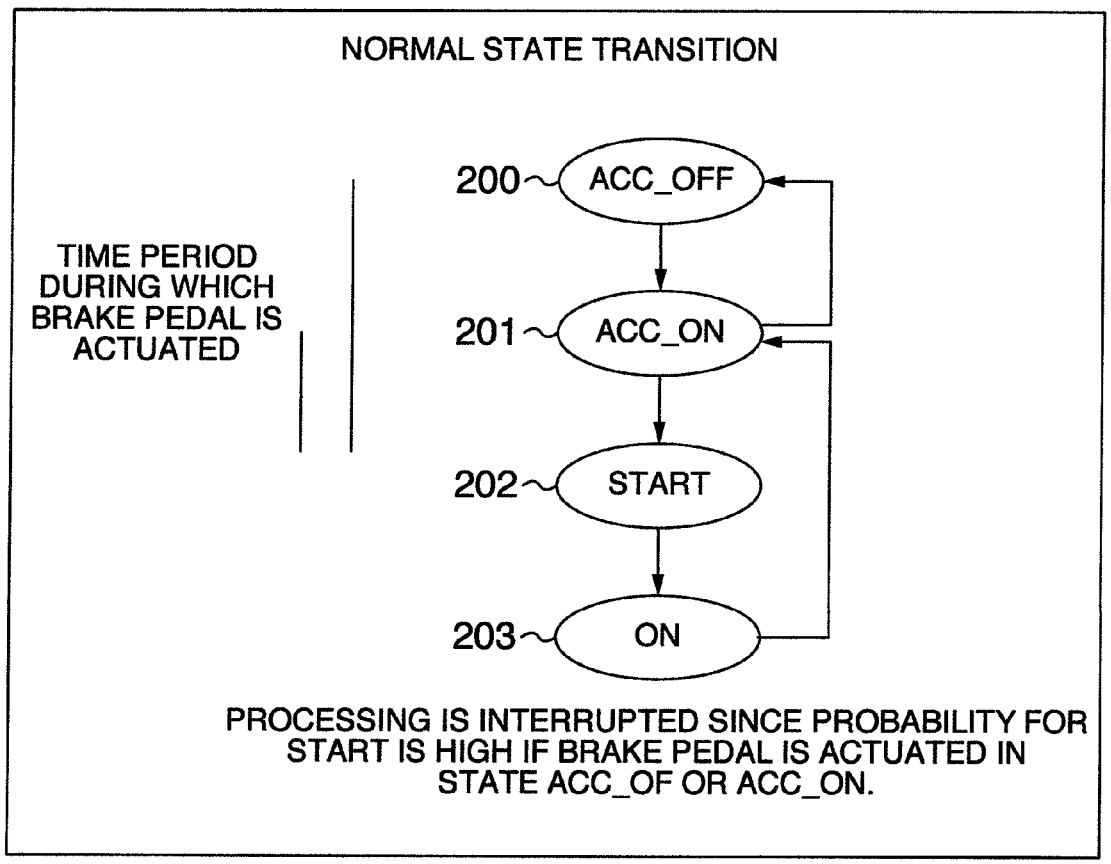
FIG. 2 is a diagram showing an example of a power source state transition of the vehicle-mounted device.

The power source interface 110 receives two types of power source signal; ACC and +B, for supplying the power to the vehicle-mounted device 100. The power source includes four states as shown in FIG. 2, and the power source interface 110 detects a state ACC_OFF from among the four states.

The vehicle 101 mounts with the vehicle-mounted device 100, and the vehicle including, for example, a gasoline-driven vehicle, electric-powered vehicle, diesel-powered vehicle, fuel-cell vehicle, power-driven two-wheeled vehicle, power-driven three-wheeled vehicle, power-driven bicycle, etc. The vehicle 101 provides a power source for supplying the power to the vehicle-mounted device 100 and also a device for acquiring a condition of the vehicle 101, such as the brake pedal condition, vehicle speed, parking brake condition, etc., to notify to the vehicle-mounted device 100.

The center terminal 102 is a server for delivering the update program to the vehicle-mounted device 100. An update file is then transmitted to the vehicle-mounted device 100, along with the notification of an updatable program and a download request from the vehicle-mounted device 100.

The network 103 couples the vehicle-mounted device 100 and the center terminal 102. The network 103 may be of either a mobile telephone network; wireless communication network such as a wireless communication using IEEE 802.11 series, IEEE 802.16 series, IEEE 802.15 series, UWB, etc.; or wire communication network, and may also be of a network combined with the above-mentioned networks.

FIG. 2 is an example of a power source state transition diagram of the vehicle-mounted device in this embodiment. The power source supplied to the vehicle-mounted device 100 from the vehicle 101 takes four states: an ACC_OFF 200, ACC_ON 201, START 202 and ON 203. The state transition of power source takes from ACC_OFF 200 to ACC_ON 201, from ACC_ON 201 to START 202, or from ACC_OFF 200, START 202 to ON 203, and from ON 203 to ACC_ON 201.

The ACC_OFF 200 indicates a state where the engine on the vehicle 101 stops and the power is not supplied to the vehicle-mounted device 100. The vehicle-mounted device 100 does not provide a service, such as a routing assistance up to a destination, for the user in the state ACC_OFF 200. In the state ACC_OFF 200, the electric power is not generated to therefore supply about 12 volts as a battery voltage to +B since the engine on the vehicle 100 stops.

The state ACC_ON 201 indicates that the engine on the vehicle 101 stops and the power is supplied to the vehicle-mounted device 100. In the state ACC_ON 201, the vehicle-mounted device 100 provides the service for the user. In the state ACC_ON 201, the electric power is not generated to therefore supply about 12 volts as a battery voltage to +B and ACC since the engine on the vehicle 100 stops.

The state START 202 indicates that the power supplied to the vehicle-mounted device 100 is unstable since a starter rotates for starting the engine on the vehicle 101. The power supply voltage supplied to ACC and +B is reduced down to about 6 to 5 volts, depending on circumstances.

The state ON 203 indicates that the engine on the vehicle 101 runs and the power is supplied to the vehicle-mounted device 100. In the state ON 203, the vehicle-mounted device 100 provides the service for the user. In the state ON 203, a charging voltage of about 13 volts supplied from a generator to the battery is supplied to ACC and +B since the engine on the vehicle 101 runs.

When the user jumps into the vehicle 101 and activates the vehicle-mounted device 100, the state is often transferred to ACC_OFF 200, ACC_ON 201, START 202 and ON 203 in series. In this case, the time period taking the state ACC_ON 201 and START 202 is often short. For this reason, in the state ACC_ON 201, the vehicle-mounted device 100 begins to activate and stop on the way since the power condition becomes unstable at START 202, and the vehicle-mounted device 100 sometimes activates at ON 203 again.

The state is often transferred to ON 203, ACC_ON 201 and ACC_OFF 200 in series when the vehicle-mounted device 100 is made stop so that the user stops the vehicle 101 to step off from it. In this case, the time period taking ACC_ON 201 is often short. However, the transition to be able to take from ACC_ON 201 is not only ACC_OFF 200, but also START 202. Since the user starts the engine after stopping once and the state is transferred from ACC_ON 201 to START 202 by the short period of time, the power supplied to the vehicle-mounted device 100 becomes unstable.

Since the vehicle-mounted device 100 does not provide a predetermined service for the time period during which the state is ACC_OFF 200, the user is not waited even though the processing such as the update is implemented. However, the supplied power becomes unstable when the transition to START 202 occurs on the update processing, therefore, there arises a problem that an appearance occurs such that the write in the storage device 106 is not implemented normally. Likewise, it can be considered that the update is implemented in parallel with the service to be provided for the user in the state ACC_ON 201, however, there arises a problem that the update does not carry on since the write in the storage device 106 is not implemented normally in the transition to START 202.

Figure 3:
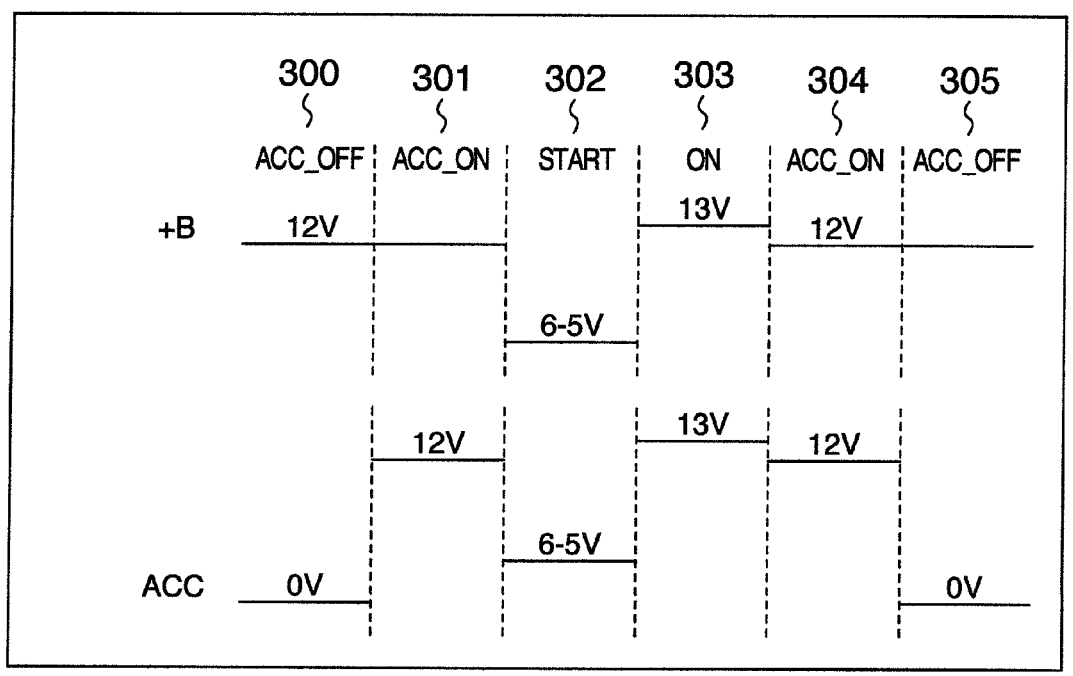
FIG. 3 is an explanatory diagram showing an example of a power source condition and a supply voltage of the vehicle-mounted device.

FIG. 3 is an example of an explanatory diagram showing the power source condition and the voltage to be supplied in the vehicle-mounted device 100 in this embodiment. This shows the power source voltage variation when the user jumps into the vehicle 101 which stops, starts the engine, drives, stops the vehicle 101, turns off the engine, and steps off from the vehicle 101. The condition of power source is transferred to the state ACC_OFF 200, ACC_ON 201, START 202, ON 203, ACC_ON 201 and ACC_OFF 200 in series. In this case, the time period of ACC_ON 301 and ACC_ON 304 is often short.

The time period of ACC_OFF 300 and ACC_OFF 305 is situated in the state ACC_OFF 200, and about 12 volts is supplied to +B, but not supplied to ACC. The time period of ACC_ON 301 and ACC_ON 304 is situated in the state ACC_ON 201, and about 12 volts is supplied to both +B and ACC. The time period of START 302 is situated in the state START 202, which is the time period during which the power to be supplied is unstable, and about 6 to 5 volts is supplied to both +B and ACC.

FIG. 4 is an example of a flowchart for explaining an operation of the update processing unit 122. The update processing unit 122 and interrupt and restart detecting unit 123 in the update program 121 are implemented in parallel with the program A 119 or program B 120 for providing the service of vehicle-mounted device 100, after activating the vehicle-mounted device 100. The update program 121 is coupled to the center terminal 102 via the communication interface 107 and network 103 to check the presence or absence of update program. When the update program is present, an initial value for the execution underway update processing 117-10, download processing progress 117-20 and program update processing progress 117-30 is set, the update flag 116 is made ON to set to the condition indicating that the update is underway, and the processing of update processing unit 122 is started.

First, the update flag 116 is checked at a step 401. The processing proceeds to a step 402 if the update flag 116 is ON indicating that the update is implemented, and is ended if the update flag 116 is OFF indicating that there is no update.

The execution underway update processing 117-10 in the update progress 117 is checked at the step 402, and the processing proceeds to a step 403 if the download processing is underway. The processing proceeds to a step 408 if the program update processing is underway.

The interrupt flag 118 is checked at the step 403. If the interrupt flag 118 is ON indicating that the interrupt is indicated, it is continued that the interrupt flag 118 is checked at the step 403 until the interrupt is released. The processing proceeds to a step 404 if the interrupt flag 118 is OFF indicating that the interrupt is released.

At the step 404, one block of a file indicated by the download file 117-22 is requested and received from a server indicated by the download server 117-21 of the download progress 117-20 in the update progress 117. The processing proceeds to a step 405 after completing to receive the one block.

At the step 405, the data of one block received at the step 404 is written in a write location, of the storage device 106, indicated by the download-file write completed byte number 117-23 of the download progress 117-20 in the update progress 117. This location is an area storing the program B 120 when the activation flag 113 indicates the program A, and is a location moving forward to by the number of bytes indicated by the download-file write completed byte number 117-23. The processing proceeds to a step 406 when completing the write.

At the step 406, the download-file write completed byte number 117-23 in the download processing progress 117-20 is updated. Even when this update is interrupted, it is made to be able to request the data, from the server indicated by the download server 117-21, at the location moving forward to by the download-file write completed byte number 117-23 in the file indicated by the download file 117-22.

At a step 407, the size of file indicated by the download file 117-21 is compared with the download-file write completed byte number 117-23 to check the completion of download. The processing returns to the step 403 to continue the download processing if the download is not completed. The execution underway update processing 117-10 is changed to the program update processing if the download is completed, and the processing proceeds to a step 408 to start the program update processing.

At the step 408, the interrupt flag 118 is checked, and the check for the interrupt flag 118 is continued at the step 408 until the interrupt is released if the interrupt flag 118 is ON indicating that the interrupt is indicated. The processing proceeds to a step 409 if the interrupt flag 118 is OFF indicating that the interrupt is released.

At the step 409, an executable program is constructed from the one block of file indicated by the program update file 117-31 of the program update processing progress 117-30 in the update progress 117. The processing proceeds to a step 410 if the construction of one block is completed.

At the step 410, the data of one block of the program constructed at the step 409 is written in a write location, of the storage device 106, indicated by the program-update file write completed byte number 117-32 of the program update processing progress 117-30 in the update progress 117. This location is an area storing the program B 120 when the activation flag 113 indicates the program A, and is a location moving forward to by the number of bytes indicated by the program-update file write completed byte number 117-32. The processing proceeds to a step 411 when the write is completed.

At the step 411, the program-update file write completed byte number 117-32 in the program update processing progress 117-30 is updated. Even when this update is interrupted, it is made to be able to restart the construction of data from the location moving forward to by the program-update file write completed byte number 117-32 of the file indicated by the program update file 117-31.

At a step 412, the program update file 117-31 is compared with the program-update file write completed byte number 117-32 to check the completion of program update processing. The processing returns to the step 408 to continue the program update processing if the update is not completed, and the processing is ended if it is completed.

FIG. 6 is an example of a flowchart for explaining an operation of the interrupt and restart detecting unit 123. The operation in the flowchart starts at a time of starting the update processing of program and ends at a time of completing the program update processing as a condition.

At a step 501, the power source condition is acquired from the power source interface 110. Subsequently, the brake pedal condition, vehicle speed and parking brake condition are acquired from the vehicle condition acquisition interface 109, at a step 502. At a step 503, it is determined whether the following interrupt condition 1 is satisfied from the power source condition and the vehicle condition respectively acquired at the steps 501 and 502.

Interrupt condition 1: the vehicle speed is zero and the brake pedal is being actuated.

The interrupt flag 118 is made ON if the Interrupt condition 1 is satisfied at a step 504, and it is made OFF if the Interrupt condition 1 is dissatisfied at a step 505. The processing then proceeds to a step 506. At the step 506, the update flag 116 is checked. The processing is ended if the update processing is completed, and the processing returns to the step 501 to continue the processing if the update processing is underway.

When the user transfers the condition of power source of vehicle-mounted device 100 to the state START 202, the user actuates the brake pedal to implement the above-mentioned operation since the vehicle 101 stops, in an normal operation. For this reason, the update processing is interrupted in the Interrupt condition 1 to complete the write in the storage device 106 and make interrupt the update processing, before transferring to START 202. The user releases his/her foot from a brake pedal if the state is transferred to ON 203. That is, since the Interrupt condition 1 becomes dissatisfied after leaving the state of START 202, the update processing is carried on steadily by using the time period of the states: ACC_OFF 300, ACC_ON 301, ON 303, ACC_ON 304 and ACC_OFF 305, during which the condition of power source is stable, and the update time becomes long with the reprocessing etc. caused by a write failure in the storage device 106, therefore, it is disappeared that the user is waited. The Interrupt condition 1 is also effective to an idling stop function when the vehicle stops at a traffic signal.

The same effect as the Interrupt condition 1 is acquired even though it is changed to the following determination condition.

Interrupt condition 2: the parking brake is being actuated and the brake is being actuated.

Interrupt condition 3: the condition of power source is being set to either the state ACC_OFF 200 or ACC_ON 201 and the brake is being actuated.

The interrupt condition may also be set to the case where either the Interrupt condition 1, 2 or 3 is satisfied.

Since the update is implemented in parallel with the service for providing the vehicle-mounted device 100 for the time period of the state ACC_ON 301, ON 303 and ACC_ON 304, an execution speed of the program A 119 or program B 120 providing the service is sometimes reduced.

In such case, the interrupt condition is changed over to the following Interrupt condition 4. In consequence, the update processing is implemented for the time period of the state ACC_OFF 305 and ACC_OFF 300, except the above-mentioned time period, therefore, it is disappeared to impact on the capability of service provided by the vehicle-mounted device 100.

Interrupt condition 4: the power source is not the state ACC_OFF 200.

This embodiment has described the case where the update data is acquired from the communication interface 107 and center terminal 102 to update the program in the storage device 106, however, may be acquired from a carriageable memory (SD memory, USB memory), a carriageable HDD, CD, DVD, BD, etc.

The activation flag 113 is used for selecting not only the two of program A 119 and program B 120, but may also be used for selecting from arbitrary number of activation programs. This can store the program of plural versions, and plural programs each having different application can also be selected.

The update program 121 may be contained in the contents of program A 119 and program B 120. This also allows the update of update program 121.

Embodiment 2

The following description will be concerned with an example of the system for implementing the online update containing a reactivation processing in a second embodiment.

Figure 7:
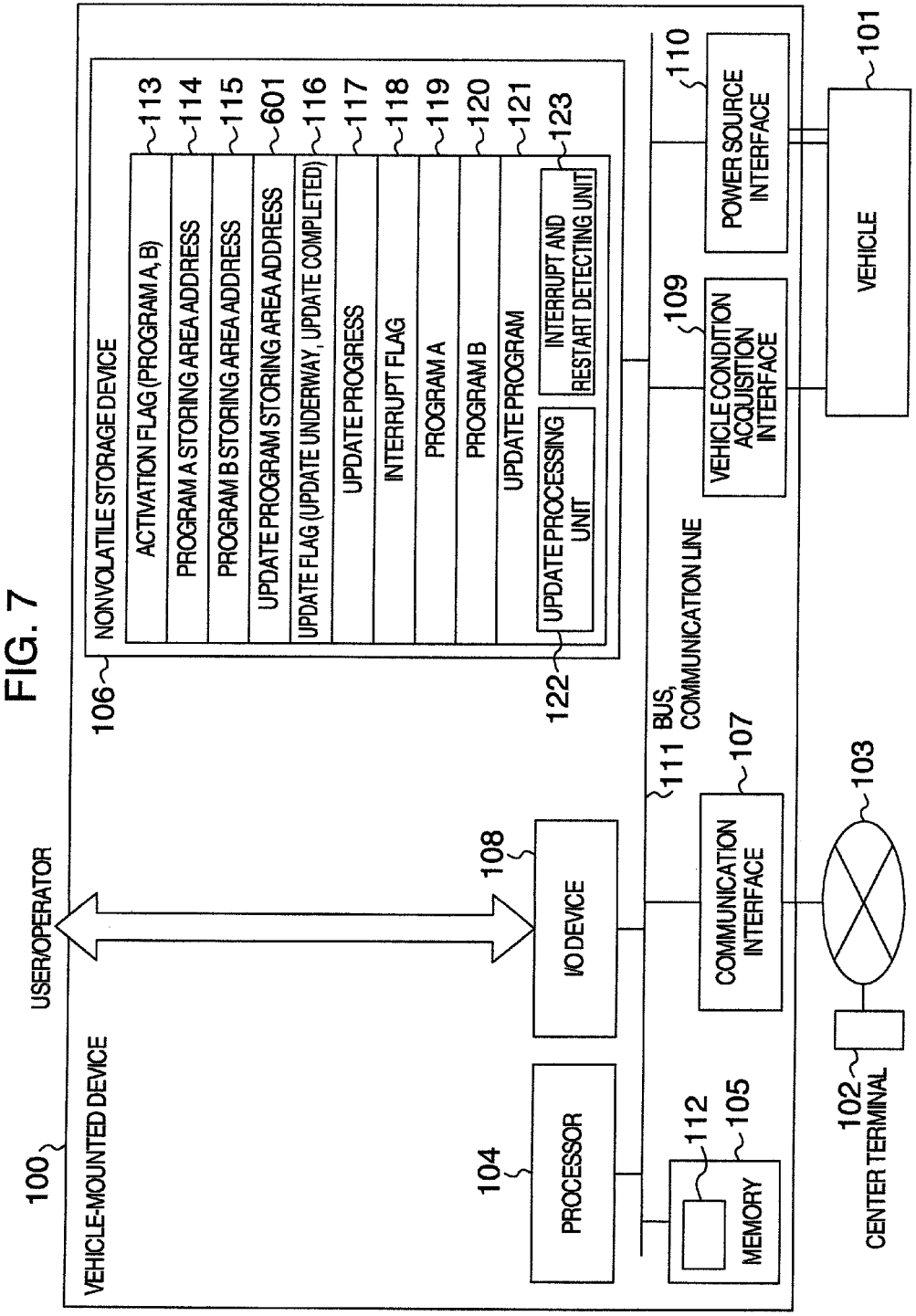
FIG. 7 is a diagram showing a configuration example of the online update system for vehicle-mounted device containing a reactivation processing.

FIG. 7 is a configuration example diagram showing the online update system of vehicle-mounted device containing the reactivation processing in a second embodiment. Of the online update system in vehicle-mounted device in FIG. 7, a description is omitted for elements in FIG. 7 having the same reference numerals as those in FIG. 1.

The activation flag 113 can select the update program 121 in addition to the program A 119 and program B 120. An update program storing area address 601 indicates an address storing the update program 121. In this way, the activation flag 113 indicates the update program 121, in the reactivation, to refer to the update program storing area address 601 and be able to execute the update program 121.

Since the update progress 117 records the progress of reactivation update processing, the execution underway update processing 117-10 also indicates the reactivation update processing in addition to the download processing and program update processing, as shown in FIG. 9 illustrating the example of explanatory diagram of the update progress data configuration considered of the update processing containing a reactivation update. A reactivation update processing progress 117-40 is added to the update progress 117. The information of reactivation update processing progress 117-40 contains a reactivation update file 117-41 and a reactivation-update file write completed byte number 117-42.

Figure 8:
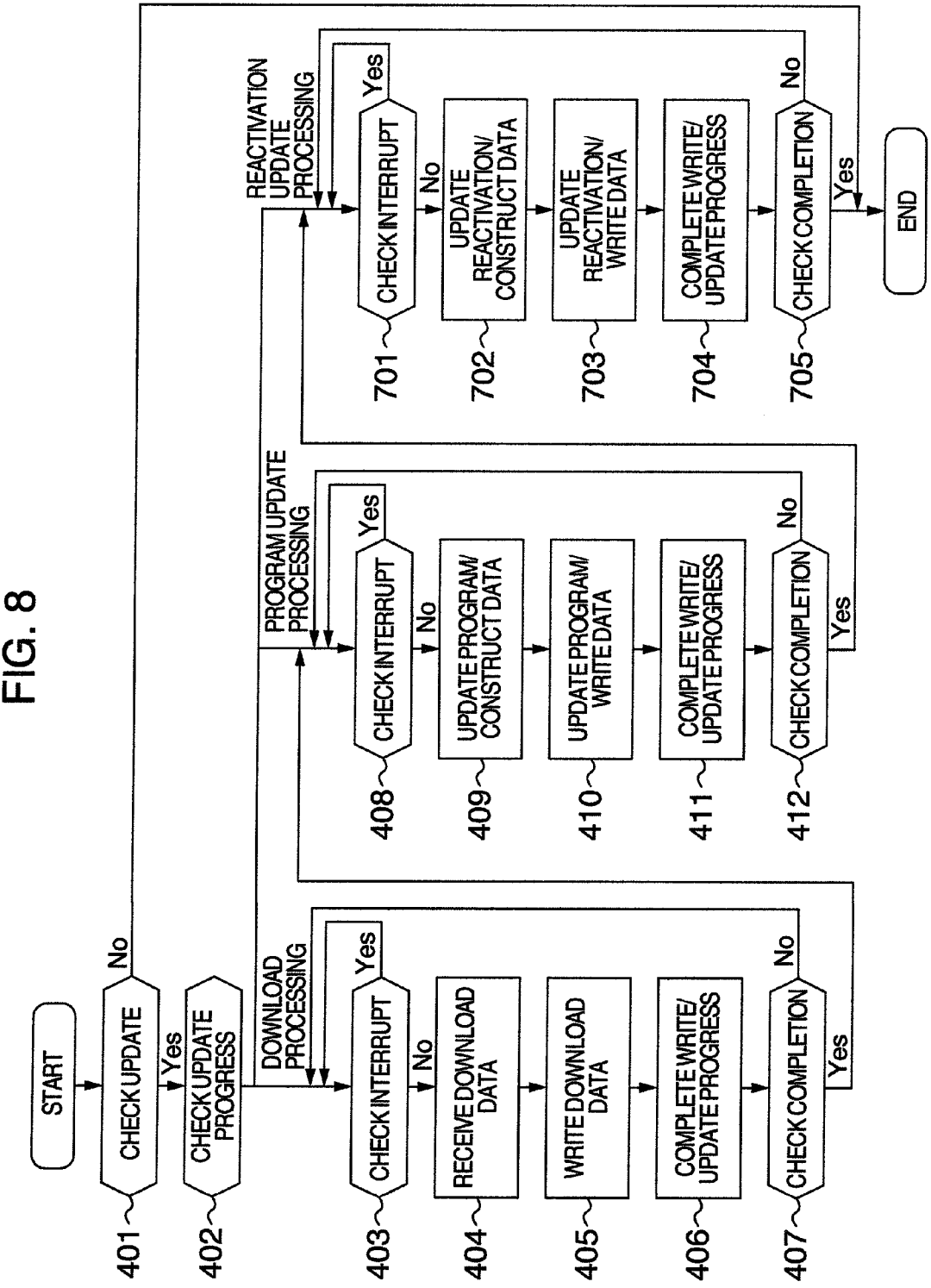
FIG. 8 is a flowchart showing an operation example of the update processing unit containing the reactivation processing.

FIG. 8 is an example of a flowchart for explaining an operation of the update processing unit containing the reactivation processing in the second embodiment. A description is omitted for steps in FIG. 8 having the same reference numerals as those in FIG. 4.

The execution underway update processing 117-10 is checked at the step 402. The processing at a step 701 is implemented when the execution underway update processing 117-10 indicates the reactivation update processing. When the completion of program update processing is checked at the step 412, the processing is implemented at the step 701 such that the execution underway update processing 117-10 is implemented as the reactivation update processing.

The interrupt flag 118 is checked at the step 701. The interrupt flag 118 is continued to be checked at the step 701 until the interrupt is released if the interrupt flag 118 is ON indicating that the interrupt is indicated. The processing proceeds to a step 702 if the interrupt flag 118 is OFF indicating that the interrupt is released.

At the step 702, the data of program, which cannot be updated without reactivation, is constructed from a file indicated by the reactivation update file 117-41 of the reactivation update processing progress 117-40 in the update progress 117. The data of one block is constructed to proceed the processing to a step 703.

At the step 703, the one block data constructed at the step 702 is written in a write location of the storage device 106 indicated by the reactivation-update file write completed byte number 117-42 of the reactivation update processing progress 117-40 in the update progress 117. This location is an area storing the program B 120 when the activation flag 113 indicates the program A, and is a location moving forward to by the number of bytes indicated by the download-file write completed byte number 117-23. The processing proceeds to a step 704 when completing the write.

At the step 704, it is made to be able to restart the update processing requiring the reactivation even when the reactivation-update file write completed byte number 117-42 in the reactivation update processing progress 117-40 is updated, and interrupted.

At a step 705, the size of file indicated by the reactivation update file 117-41 is compared with the reactivation-update file write completed byte number 117-42 to check the completion of reactivation update processing. The processing returns to the step 701 to continue the reactivation update processing if the reactivation update processing is not completed. The processing is ended if it is completed.

In consequence, it is made to be able to implement the update processing, which was not implemented, in parallel with the execution of the other program.

The Interrupt condition 1 is used in the download processing and program update processing and the Interrupt condition 4 is used in the reactivation update processing. In consequence, the download processing and program update processing carry on the update using the time period of ON 303, ACC_ON 304, ACC_OFF 305, ACC_OFF 300 and ACC_ON 301, during which the supply power is stable. The reactivation update processing is implemented by using the time period of ACC_OFF 305 and ACC_OFF 300. The reactivation is implemented for the time period of ACC_ON 301, ON 303 and ACC_ON 304, and the service to be provided by the vehicle-mounted device 100 cannot be made provide on the reactivation. In consequence, the user is waited. However, by using the Interrupt condition 4 as an interrupt condition of the reactivation update processing, the update processing can be implemented without occurring the time period during which the user is waited.

Embodiment 3

In a third embodiment, a description will be concerned with an example of the online update system for implementing the interrupt of update processing not only for the time period during which the power source is unstable, but also for it during which a processing load of the processor 104 is high.

Figure 10:
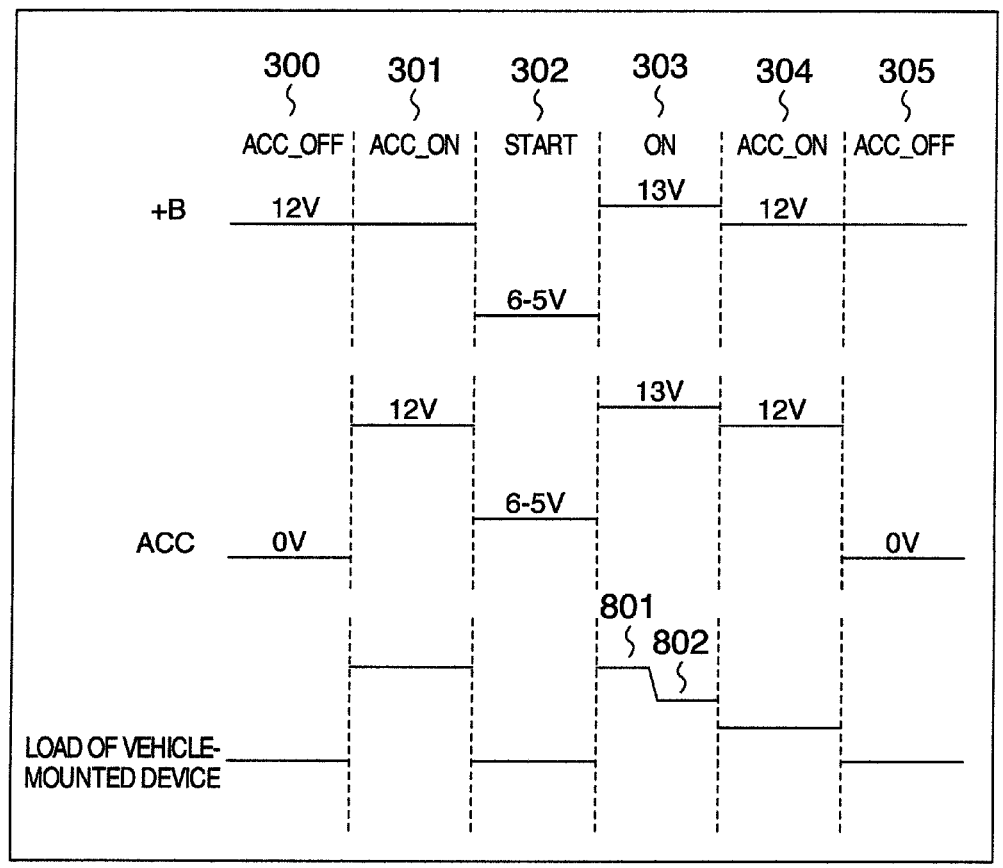
FIG. 10 is an explanatory diagram showing an example of the power source condition in the vehicle-mounted device, a supply voltage condition and a load variation in the vehicle-mounted device.

FIG. 10 is an example diagram of adding the load variation and further explaining the vehicle-mounted device. A description is omitted for portions in FIG. 10 having the same reference numerals in FIG. 3.

The update processing is activated at a timing of varying the state from ACC_OFF 300 to ACC_ON 301 since the service of vehicle-mounted device 100 is provided from the time period of ACC_ON 301. For this reason, the load for the time period of ACC_ON 301 becomes high. The vehicle-mounted device 100 sometimes stops when entering the time period of START 302 on the activation processing, since the power source condition is unstable for the time period of START 302.

FIG. 10 shows an example in which the vehicle-mounted device 100 stops for the time period of START 302. The time period of START 302 is ended and the state is transferred to ON 303, during which the power source is stable, to reactivate and start a time period 801 during which the load is high. The activation is completed to become a time period 802 during which the load is stable. The time period of ACC_ON 304 indicates a low processing load as long as an instruction is not entered by the user, in particular. The vehicle-mounted device 100 stops if the update processing is not remained when varying the state from ACC_ON 304 to ACC_OFF 305.

The activation time in the vehicle-mounted device 100 is a primary time period during which the user is waited. The update processing is implemented in parallel for this time period to sometimes occur a time period during which the user is further waited. The time period during which the processing load is high on the processing implementation of the service provided by the vehicle-mounted device 100 often causes the case where the user is waited.

FIG. 11 shows an example of a flowchart for explaining an operation of the interrupt and restart detecting unit considered of a processor load in the third embodiment. Of the flowchart for explaining the operation of the interrupt and restart detecting unit shown in FIG. 6, a description is omitted for the steps shown in FIG. 11 having the same reference numerals in FIG. 6.

The processing at a step 901 acquires the processing load of processor 104 in the vehicle-mounted device 100. At the step 503, it is determined whether the following Interrupt condition 5 is satisfied, from the power source state and vehicle condition acquired respectively at the steps 501, 502.

Interrupt condition 5: the processor load is equal to or greater than 60%, or the interrupt flag 118 is made ON at the step 504 if the Interrupt condition 1 and Interruption condition 5 are satisfied, and the interrupt flag 118 is made OFF if they are dissatisfied, and the processing proceeds to the step 506. In the step 506, the update flag 116 is checked. The processing is ended if the update processing is completed, and returned to the step 501 to continue the processing if the update processing is underway.

The same advantage mentioned above can be acquired even though the Interrupt condition 5 is changed to the following determination condition.

Interrupt condition 6: the processor load is equal to or greater than 60%, or the Interrupt condition 2.

Interrupt condition 7: the processor load is equal to or greater than 60%, or the Interrupt condition 3, The combination of the Interrupt condition 5, Interrupt condition 6 and Interrupt condition 7 may also be used for the determination.

The value of processor load for interrupting the update is set to 60% in this example, however, an appropriate value may be set to the vehicle-mounted device 100 to be targeted. This value may also be set from the user using the I/O device 108. This value may be transferred from the center terminal 102 to the vehicle-mounted device 100.

By using the interrupt and restart processing in this embodiment replaced with the update processing in the first embodiment, the download processing and program update processing can be implemented by using the time period 802, during which the processing load of processor 104 is stable and the time period of ACC_ON 304, ACC_OFF 305, ACC_OFF 300 and ACC_ON 301, during which the power source is stable and the processing load of processor 104 is low.

By using the interrupt and restart processing in this embodiment replaced with the update processing in the second embodiment, the download processing and program update processing can be implemented by using the time period 802 during which the processing load of processor 104 is stable and the time period of ACC_ON 304, ACC_OFF 305, ACC_OFF 300 and ACC_ON 301, during which the power source is stable and the processing load of processor 104 is low. The reactivation update processing can be implemented for the time period of ACC_OFF 305 and ACC_OFF 300 by the Interrupt condition 4, during which the user is not waited by causing the reactivation.

The configuration mentioned above can make the impact on the activation time small, effected from the processing time increasing caused by installing the online update processing. In consequence, it is realized that the time for which the user is waited and the time taking the program update processing can be shortened, as a big problem of facing of the vehicle-mounted device.

The specification and drawings are, accordingly, to be regarded in an illustrative rather than a restrictive sense. It will, however, be evident that various modifications and changes may be made thereto without departing from the spirit and scope of the invention(s) as set forth in the claims.

The invention claimed is:

1. A vehicle-mounted device, mounted on a vehicle, providing a processor and a storage device to execute a program stored in the storage device by the processor, the vehicle-mounted device comprising:
   an interrupt and restart detecting unit, configured to acquire a vehicle condition including a brake pedal condition, a vehicle speed, and a parking brake condition from a vehicle condition acquisition interface and to acquire the conditions of a power source from a power source interface;

an update processing unit, configured to:
continue an update processing of the program when a current vehicle condition, having been acquired by the interrupt and restart detecting unit does not satisfy a predetermined update processing interrupt condition; and
interrupt the update processing of the program when the current vehicle condition having been acquired by the interrupt and restart detecting unit satisfies the update processing interrupt condition, wherein:
(1) the update processing interrupt condition is that the vehicle speed is zero and the brake pedal is being actuated,
(2) the update processing interrupt condition is that the parking brake is being actuated and the brake pedal is being actuated,
(3) the update processing interrupt condition is that the power source condition is either in an ACC OFF state or in an ACC ON state and the brake pedal is being actuated, or
(4) the update processing interrupt condition is that the power source condition is not in the ACC_OFF state, and
wherein
the ACC ON state is a state in which the engine on the vehicle stops and power is supplied to the vehicle-mounted device, and
the ACC_OFF state is a state in which the engine on the vehicle stops and power is not supplied to the vehicle-mounted device.

2. The vehicle-mounted device according to claim 1, further comprising:
an update data acquisition means of the program configured to:
implement an update data acquisition processing of the program when the vehicle condition acquired by the vehicle condition acquisition interface does not satisfy a predetermined update data acquisition interrupt condition, and
interrupt the update data acquisition processing of the program when the update data acquisition interrupt condition is satisfied.

3. The vehicle-mounted device according to claim 2, wherein
the vehicle condition acquired by the vehicle condition acquisition interface further includes the vehicle speed, and
the update data acquisition interrupt condition indicates that the vehicle speed is zero and the brake pedal is being actuated.

4. The vehicle-mounted device according to claim 1, further comprising:
a reactivation update processing means of the program, configured to:
implement a reactivation update processing process of the program when the vehicle condition acquired by the vehicle condition acquisition interface does not satisfy a predetermined reactivation update processing interrupt condition, and
interrupt the reactivation update processing process of the program when the reactivation update processing interrupt condition is satisfied.

5. The vehicle-mounted device according to claim 4, wherein
the vehicle condition acquired by the vehicle condition acquisition interface further includes the vehicle power source condition, and
the reactivation update processing interrupt condition indicates that the power source condition is not the ACC_OFF state.

6. The vehicle-mounted device according to claim 1, wherein:
the vehicle-mounted device further comprises a load acquisition unit;
the update processing unit:
implements the update processing of the program when the acquired load of the processor is less than a predetermined value or the vehicle condition acquired by the vehicle condition acquisition interface does not satisfy the update processing interrupt condition, and
interrupts the update processing of the program when the acquired load of the processor is equal to or less than the predetermined value or the vehicle condition acquired by the vehicle condition acquisition interface satisfies the update processing interrupt condition.

7. The vehicle-mounted device according to claim 2 wherein
the update data acquisition means includes a wire/wireless communication interface or a carriageable memory.

8. The vehicle-mounted device according to claim 1, wherein:
the update processing unit is configured to continue the update processing of the program when the vehicle condition acquired by the vehicle condition acquisition interface does not satisfy a predetermined update processing interrupt condition with determining that the power source is stable; and
the interrupt and restart detecting unit is configured to interrupt the update processing of the program when the vehicle condition acquired by the vehicle condition acquisition interface satisfies the update processing interrupt condition with predicting that the power source becomes unstable.

9. The vehicle-mounted device according to claim 8, wherein:
the interrupt and restart detecting unit is further configured to:
set an interrupt flag for the update processing to OFF in a case that the vehicle condition acquired by the vehicle condition acquisition interface does not satisfy a predetermined update processing interrupt condition with determining that the power source is stable; and
set the interrupt flag to ON in a case that when the vehicle condition acquired by the vehicle condition acquisition interface satisfies the update processing interrupt condition with predicting that the power source becomes unstable; and
the update processing unit is configured to:
continue the update processing of the program if the interrupt flag has been set to OFF; and
interrupt the update processing of the program if the interrupt flag has been set to ON.

* * * * *